United States Patent [19]

Skala

[11] 4,189,916
[45] Feb. 26, 1980

[54] VEHICLE SYSTEM FOR NAK-WATER-AIR INTERNAL COMBUSTION ENGINES

[76] Inventor: Stephen F. Skala, 3839 S. Wenonah Ave., Berwyn, Ill. 60402

[21] Appl. No.: 779,788

[22] Filed: Mar. 21, 1977

Related U.S. Application Data

[63] Continuation-in-part of Ser. No. 301,285, Oct. 27, 1972, abandoned, and a continuation-in-part of Ser. No. 457,207, Apr. 2, 1974, Pat. No. 3,911,284, and a continuation-in-part of Ser. No. 464,454, Apr. 26, 1974, abandoned, and a continuation-in-part of Ser. No. 578,527, May 19, 1975, Pat. No. 4,020,798.

[51] Int. Cl.$^2$ ............................ F02C 3/20; F01N 3/02
[52] U.S. Cl. .................................. 60/311; 60/39.46 R
[58] Field of Search ............... 60/39.46 R, 39.46 S, 60/311; 123/1 A; 55/76, 96, 242, 243, 284

[56] References Cited

U.S. PATENT DOCUMENTS 3,922,152   11/1975   Kookoothakis ........................ 60/311

*Primary Examiner*—Louis J. Casaregola

[57] ABSTRACT

In a vehicle having an engine which derives power from a reaction of NaK and water in the presence of air, NaK hydroxide is a reaction product in the form of particulates suspended in an exhaust gas consisting principally of nitrogen with some water vapor. In order to release the exhaust as a harmless gas to the atmosphere and to retain the NaK hydroxide in the vehicle for removal during a fuel stop and subsequent reduction back to NaK metal, several stages of separation of the particulates from the gas are provided. A first stage, preferably based upon impingement of the NaK hydroxide particulates on a molten NaK hydroxide surface, separates a substantial portion of the particulates. A final stage of separation comprises filtration wherein two filters are used alternately, one filter separating the water soluble NaK hydroxide particulates from the exhaust gas while the other filter is being flushed with water as a solvent to dissolve accumulated NaK hydroxide thereby regenerating the filter. The flushing water which contains the dissolved NaK hydroxide is returned to a reservoir which also provides the water for the reaction of NaK and water. The functions of storing a reactant for combustion and of storing a solvent for dissolving accumulated particulates are both provided by a single body of liquid to result in a more simple structure and in less weight than would be feasible if separate reservoirs were used for the reactant and for the solvent.

1 Claim, 3 Drawing Figures

VEHICLE SYSTEM FOR NAK-WATER-AIR INTERNAL COMBUSTION ENGINES

BACKGROUND

The present invention is a continuation-in-part of application Ser. No. 301,285 filed Oct. 27, 1972 and now abandoned; and is a continuation-in-part of Ser. No. 457,207 filed Apr. 2, 1974 and now U.S. Pat. No. 3,911,284; and is a continuation-in-part of Ser. No. 464,454 filed Apr. 26, 1974 and now abandoned; and is now a continuation-in-part of Ser. No. 578,527 filed May 19, 1975 and now U.S. Pat. No. 4,020,798.

This invention relates to vehicles having an internal combustion engine based on a fast reaction of NaK and water in the presence of air, and more particularly it relates to processing products of the reaction to assure environmental compatibility.

The eutectic alloy of sodium and potassium called NaK functions as a secondary energy source to transfer energy from a primary source to vehicles in a cyclical process. Power is generated in the vehicle by oxidizing NaK metal to NaK hydroxide which is collected and unloaded during a fuel stop for transport to a regenerating plant where it is converted back to NaK metal. An example of such an energy system is provided by my U.S. Pat. No. 3,911,288 wherein NaK hydroxide dissolved in water is pipelined to an electrolysis plant and regenerated NaK metal is returned by another pipeline to distributing stations. NaK hydroxide can also be regenerated thermochemically in a reaction using coal.

NaK has reasonable characteristics as a fuel. It is portable as a liquid to a temperature of −11° C., it does not result in harmful gaseous emissions, and it is based on abundant materials which are recycled. Its disadvantages include a possibility of freezing in frigid weather and formation of NaK hydroxide as particulates which must be separated from exhaust gases. It is a general object of this invention to obviate these disadvantages.

OBJECTS OF THE INVENTION

It is a general object of this invention to provide an improved vehicle having an internal combustion engine based on a NaK, water, and air reaction.

It is another object of this invention to provide a vehicle of the kind described which separates NaK reaction products from exhaust gases to allow regeneration of NaK hydroxide and to avoid release of harmful emissions.

SUMMARY OF THE INVENTION

These and other objects and advantages are attained through methods and apparatus of the present invention wherein heat and chemical reaction products of a NaK, water, and air reaction in an internal combustion engine are processed to separate NaK hydroxide particulates from exhaust gases and to store exhaust heat for use after an idle period. Most of the particulates are separated by impingement upon molten NaK hydroxide stored in an insulated vessel. Remaining particulates are separated by a filter system comprising two filters operating alternately with the nonoperating filter flushed with water to dissolve accumulated NaK hydroxide. The flushing water is subsequently used as a reactant in the internal combustion engine. Heat is stored in a body of NaK hydroxide which is stored in the insulated vessel. One function of the stored heat is to maintain molten NaK hydroxide surfaces for efficient separation of NaK hydroxide particulates by impingement. Another function of the stored heat is to melt water and NaK which may have frozen during idle periods in frigid weather. Heat is transferred from the insulated vessel to users by heat exchange with a circulating thermal exchange fluid. Various properties of the reaction products from the internal combustion engine are used to advantage.

One useful property of the NaK, water, and air reaction is that the otherwise acidic oxides of nitrogen form alkali salts which are separable from the exhaust gases. Such oxides of nitrogen derive from air at the high combustion temperatures which improve efficiency of power generation. Further, traces of alkali nitrite and nitrate function as corrosion inhibitors in alkali hydroxides without interfering with subsequent processing of NaK hydroxide.

Another useful property of NaK hydroxide is that it is molten at the temperature of gases expelled from the engine. As NaK hydroxide leaves the engine, it is suspended as a mist of particulates in hot exhaust gases which are principally nitrogen with some water vapor. Accumulated liquid NaK hydroxide surfaces effectively absorb the NaK hydroxide particulates for efficient separation from the gases.

Still another useful property of NaK hydroxide is its high solubility in water. Final filtration of the exhaust gases is feasible since accumulated NaK hydroxide is easily dissolved to restore free flow of the exhaust gases through the filter.

Yet another useful property of NaK hydroxide is its high latent heat of fusion which allows heat to be stored effectively at the melting temperature of NaK hydroxide to provide a persisting liquid surface for absorbing particulates after idle periods. The heat is also stored effectively for melting frozen water or NaK and for rapid space heating of a vehicle's passenger compartment.

DESCRIPTION OF THE DRAWINGS

In FIG. 1, a vehicle powered by a NaK-water-air internal combustion engine separates reaction products from exhaust gas by impingement, centrifugal, or filtration means.

Figure 1:
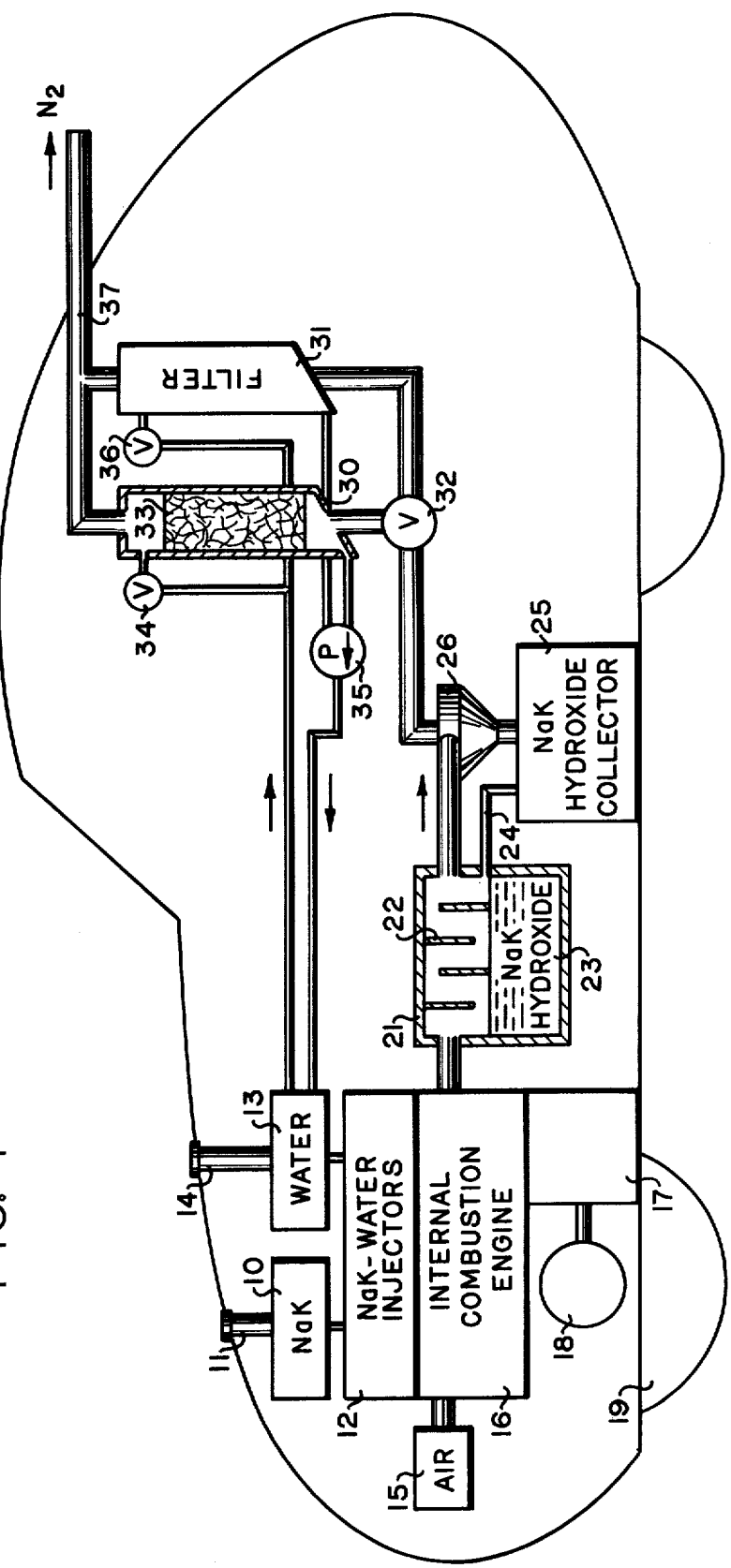
FIG. 1 is a diagrammatic representation of a vehicle system showing means for separating NaK hydroxide particulates from exhaust gases according to the invention.

Within combustion chambers of the internal combustion engine, NaK and water are injected as intersecting jets at approximately maximum air compression. Normally, water and atmospheric oxygen are in excess of stoichiometric quantities to assure complete reaction of NaK. The reaction products are principally NaK hydroxide with small quantities of NaK nitrate and nitrite. These reaction products form a mist of molten droplets which remain molten in a hot exhaust system.

NaK fuel reservoir 10 is filled during a fuel stop through pipe 11 and connects to NaK-water injectors 12. Similarly, water reservoir 13 is filled during a fuel stop through pipe 14 and connects to the NaK-water injectors. An air filter assembly 15 admits air into internal combustion engine 16. Basic features of NaK-water-air internal combustion engines are disclosed in the cited application. Briefly, the engine comprises a plurality of combustion chambers each having a NaK-water injector which injects jets of NaK and water which intersect as air approaches maximum compression. The reaction between NaK and water is virtually instantaneous after contact and released hydrogen reacts rapidly with oxygen at the high compression temperature within the combustion chamber. Gases expanding against a movable member of the combustion chamber transform a portion of the heat of reaction to mechanical energy which is coupled through transmission 17 and differential 18 to drive wheels 19. As the gases approach maximum expansion, they are released into an exhaust system. The first stage of the exhaust system is insulated impingement separator 21. Molten NaK hydroxide adheres as a film to surfaces such as plates 22. When droplets of NaK hydroxide impinge upon molten NaK hydroxide, they are absorbed and accumulating NaK hydroxide 23 flows through overflow pipe 24 into NaK hydroxide collector 25. Impingement is an effective process for separating particulates from gases when the impingement surface is a liquid, but if the NaK hydroxide is in a solid phase as it would be when the exhaust system is cold, particulates tend to be reentrained in the gases. The larger particulates are then separated by centrifugal force in cyclone separator 26. Operation of the cyclone separator is conventional with gases entering tangentially, the outer portion with entrained particles spinning downward into the NaK hydroxide collector, and the cleaner inner portion moving upward toward the final stage of separation in the exhaust system which is filtration. NaK hydroxide particulates, whether molten droplets or solid particles in the presence of water vapor condensate, tend to stick to each other and to any surface. NaK hydroxide and other NaK salts which may be present are very soluble in water so that periodic cleaning by flushing with water is feasible. A first filter 30 and a second filter 31 are operated alternately, preferably automatically in response to differential pressure, to allow flushing of the nonoperating filter. Valve 32 directs flow of exhaust gases to either the first or to the second filter. When the exhaust gases flow through the first filter, particulates adhere to filter material 33. The filter material is preferably a stainless steel wool which is loosely packed to absorb NaK hydroxide throughout its depth. Several stages of coarseness may be used with finer material as a final filter. As the filter material in the first filter becomes loaded with NaK hydroxide, valve 32 directs exhaust gases into the second filter. Valve 34 opens, pump 35 operates, and water circulates between the water reservoir and the first filter for a predetermined time to dissolve accumulated NaK hydroxide. When the filter material in the second filter becomes loaded with NaK hydroxide, valve 32 directs flow of exhaust gases back to the first filter, valve 36 opens, and the pump operates to flush the filter. Exhaust gases entering the atmosphere from exhaust pipe 37 are principally nitrogen and water vapor.

During a fuel stop, when NaK and water are pumped into their respective reservoirs, NaK hydroxide is removed from NaK hydroxide collector 25.

Figure 2:
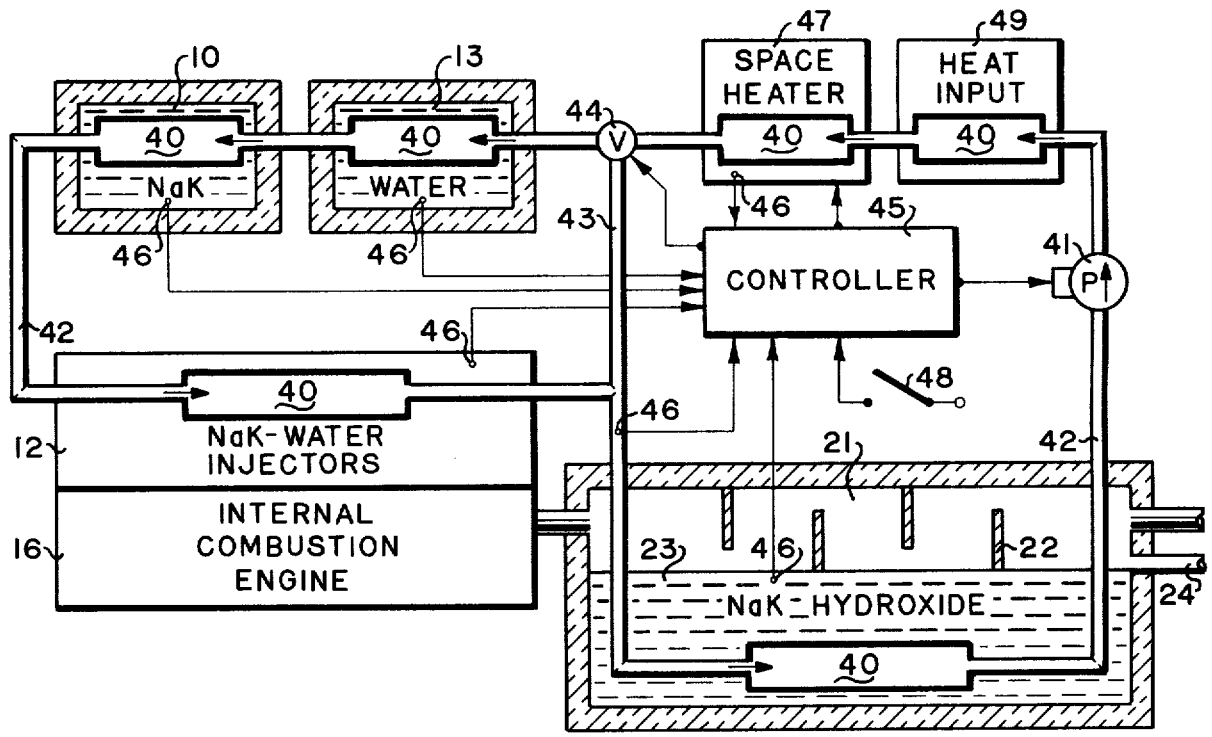
FIG. 2 is a diagrammatic representation of a portion of the vehicle system showing apparatus for transferring heat from a body of NaK hydroxide to various users.

To the vehicle system just described is added a means for heating NaK and water should they freeze in frigid weather. FIG. 2 shows portions of the vehicle system which relates to such heating means. Heat developed by reactions in the internal combustion engine is partly retained in a body of NaK hydroxide in an insulated impingement separator. The insulation retards freezing of the NaK hydroxide so that separation of particulates by impingement on a liquid surface is effective at start up. The insulated body of NaK hydroxide also provides a heat source of sufficient thermal capacity to melt NaK and water which may have frozen over normal idle periods. The heat retained principally as latent heat of fusion in the NaK hydroxide is transferred to various users by circulating a thermal exchange fluid under control of a programmable controller which monitors various temperatures to determine heating priorities.

After starting internal combustion engine 16, exhaust gas and reaction products enter insulated impingement separator 21. The temperature of plates 22 rapidly rises above the melting point of NaK hydroxide and a body of accumulated NaK hydroxide 23 is heated as the engine operates. Excess NaK hydroxide flows through overflow pipe 24 to maintain a constant level.

A hydraulic circuit comprising a contained thermal exchange fluid, heat exchangers 40, a regulated speed pump 41, conduits such as 42, by-pass conduits 43, only one shown, and motor operated selector valves 44, only one shown, is controlled by programmable controller 45 having inputs from various temperature sensors 46. The components of the hydraulic circuit are conventional and various kinds can be selected for the practice of this invention.

When all of the temperature sensors are warm, the pump does not operate and heat is retained in the body of NaK hydroxide 23 to maintain a liquid phase for effective absorption of impinging particulates. When the temperature sensor in space heater 47, which is located in the vehicle's passenger compartment, is cool but the other temperature sensors are above the freezing point of water and when the space heater is turned on, the controller provides power to selector valve 44 to direct flow of thermal exchange fluid through bypass conduit 43, to the pump to circulate the thermal exchange fluid, and to a fan not shown in the space heater. When the temperature sensors in NaK reservoir 10 or in water reservoir 13 are below their respective freezing temperatures and when vehicle start switch 48 is turned on, the controller provides power to the selector valve to direct flow of the thermal exchange fluid through the water and NaK reservoirs and through NaK-water injectors 12, and it provides power for the pump. Pump seed is regulated in response to the temperature sensor within thermal exchange fluid in a conduit to preclude heating water in the water reservoir or in the NaK-water injectors above its boiling point.

As the vehicle operates in subfreezing temperatures, thermal exchange fluid circulates to heat the NaK and water reservoirs which are insulated and normally retain sufficient heat to prevent freezing through normal idle periods. Should all temperature sensors, including that in the NaK hydroxide, drop below the freezing point of water, the vehicle can be started by operating heat input 49 with thermal exhange fluid circulating to melt frozen reactants. The heat input can be based on any convenient energy source such as electricity or hydrocarbon fuels.

The thermal exchange fluid flows at expected low temperatures and is reasonably stable at exhaust temperatures. Aromatic hydrocarbon oils are examples. A method base on NaK in a secondary heat exchange loop as described in my copending application Ser. No. 756,392 can be applied to heat less stable thermal exchange fluids.

Figure 3:
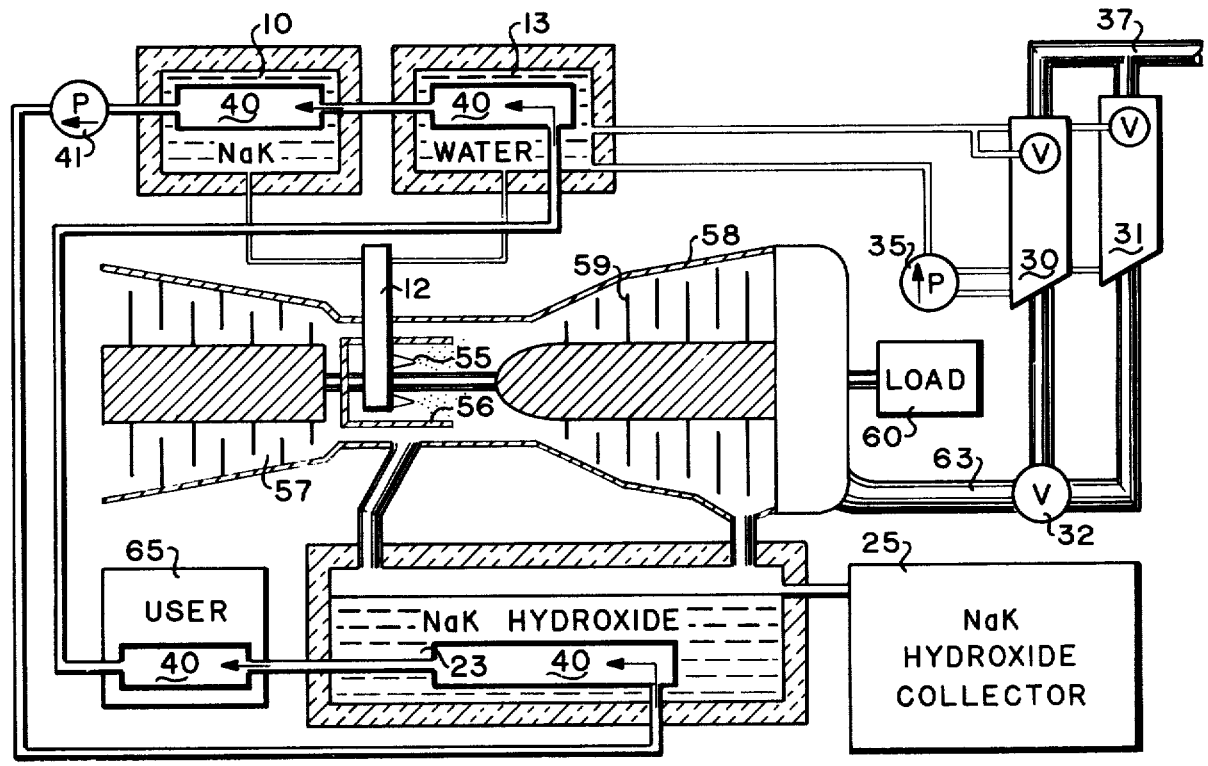
FIG. 3 is a diagrammatic representation of means for separating NaK hydroxide particulates from exhaust gases and apparatus for storing and using heat where the internal combustion engine type is a turbine.

FIG. 3 shows separation of NaK hydroxide particulates from exhaust gases and retention of exhaust heat in an insulated body of NaK hydroxide adapted to a turbine type NaK, water, and air internal combustion engine.

The turbine provides a first stage of particulate separation within its own structure based on concentration of NaK hydroxide toward outer portions by centrifugal force. This NaK hydroxide is swept by a gas stream into an insulated impingement separator from which the gas returns to the turbine. More particulate free gases nearer the central part of the turbine are exhausted to the atmosphere through filters.

NaK from NaK reservoir 10 and water from water reservoir 13 enter NaK-water injectors 12 and are injected as intersecting jets 55 into combustion chamber 56. Compressed air from compressor 57 together with the NaK and water react to form a hot gas with entrained NaK hydroxide particulates which expands into turbine 58. A rotary motion generated by the expanding gases flowing against rotor blades such as 59 is coupled to load 60 which can include a transmission and drive wheels of a vehicle. Molten NaK hydroxide particulates adhere to the rotor blades and to stators such as 61 to form a NaK hydroxide film. The rotating rotor blades drive the accumulating NaK hydroxide outward to openings 62 in the stators which openings allow NaK hydroxide and some gases to flow toward insulated impingement separator 21 where impinging NaK hydroxide drops accumulate in a body of NaK hydroxide 23 while gases with remaining NaK hydroxide return to turbine. Gases exhausting from the turbine enter duct 63 and are directed alternately by valve 32 through filters 30 and 31. The nonoperating filter is flushed with water to dissolve accumulated NaK hydroxide and the NaK hydroxide solution is returned by pump 35 to the water reservoir.

Heat is transferred by a thermal exchange fluid within heat exchangers 40 from the body of NaK hydroxide 23. In response to temperature, pump 41 circulates the thermal exchange fluid through the NaK and the water reservoirs and through users 65 which users can include the NaK-water injectors and a space heater as described with reference to FIG. 2.

What I claim is:

1. A method for separating alkali hydroxide particulates from exhaust gases comprising the steps of reacting an alkali metal, water from a water reservoir, and air in a combustion chamber to form said particulates and gases, separating a portion of said particulates from said gases in a first stage of an exhaust system, said step of separating comprising directing directing said particulates and gases to impinge upon a surface of molten alkali hydroxide, said surface retaining at least some of the particulates, directing flow of remaining particulates and gases through a first filter, said first filter accumulating said remaining particulates, directing flow of said remaining particulates and gases through a second filter, said second filter accumulating said particulates, passing water from said water reservoir through said first filter to remove said accumulated particulates, directing flow of said remaining particulates and gases back to the first filter, and passing water from the water reservoir through the second filter to remove said accumulated particulates.

* * * * *